(12) United States Patent
Lee et al.

(10) Patent No.: US 11,600,096 B2
(45) Date of Patent: Mar. 7, 2023

(54) FINGERPRINT SENSOR AND DISPLAY DEVICE INCLUDING THE SAME

(71) Applicant: SAMSUNG DISPLAY CO., LTD., Yongin-si (KR)

(72) Inventors: Soo Jung Lee, Yongin-si (KR); Keum Dong Jung, Yongin-si (KR); Yu Na Kim, Yongin-si (KR); Il Nam Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 37 days.

(21) Appl. No.: 16/796,341

(22) Filed: Feb. 20, 2020

(65) Prior Publication Data

US 2020/0311373 A1  Oct. 1, 2020

(30) Foreign Application Priority Data

Mar. 27, 2019 (KR) .................. 10-2019-0035098

(51) Int. Cl.
*G06V 40/13* (2022.01)
*G06V 10/75* (2022.01)

(52) U.S. Cl.
CPC ...... *G06V 40/1318* (2022.01); *G06V 40/1306* (2022.01); *G06V 10/751* (2022.01)

(58) Field of Classification Search
CPC .............. G06K 9/0004; G06K 9/0002; G06K 9/6202; G06K 9/00046; H01L 27/3225; H01L 27/3244; H01L 27/3227; H01L 51/502; H01L 27/323; H01L 31/10; G02B 5/20; G06V 40/1318; G06V 40/1306; G06V 10/751; G06V 40/1324
See application file for complete search history.

(56) References Cited

U.S. PATENT DOCUMENTS

| | | | | |
|---|---|---|---|---|
| 2010/0059296 | A9* | 3/2010 | Abileah | G06K 9/0004 |
| | | | | 178/18.09 |
| 2014/0133715 | A1* | 5/2014 | Ballard | G06K 9/00013 |
| | | | | 382/124 |
| 2014/0267202 | A1* | 9/2014 | Zheng | G09G 5/10 |
| | | | | 345/207 |

(Continued)

FOREIGN PATENT DOCUMENTS

KR   10-2020-0022060   3/2020

OTHER PUBLICATIONS

Babler, W. J., "Prenatal Development of Dermatoglyphic Digital Patterns: Associations with Epidermal Ridge, Volar Pad and Bone Morphology", Colleglum Antropolgicum 11.2 (1987): 297-303.

(Continued)

*Primary Examiner* — Abhishek Sarma
(74) *Attorney, Agent, or Firm* — F. Chau & Associates, LLC

(57) ABSTRACT

There are provided a fingerprint sensor and a display device including the same. The fingerprint sensor includes a base substrate in which a first sensing region and a second sensing region are defined on a plane, first photo sensors disposed on the first sensing region of the base substrate, and second photo sensors disposed on the second sensing region of the base substrate. The first sensing region has an area larger than that of the second sensing region, and the first photo sensor has a width wider than that of the second photo sensor.

7 Claims, 12 Drawing Sheets

(56) References Cited

U.S. PATENT DOCUMENTS

| | | | |
|---|---|---|---|
| 2015/0016694 A1* | 1/2015 | Kerr | G06V 40/1365 |
| | | | 382/124 |
| 2015/0078636 A1* | 3/2015 | Carver | G06K 9/0004 |
| | | | 382/124 |
| 2017/0316548 A1 | 11/2017 | Zhang et al. | |
| 2018/0089484 A1 | 3/2018 | Satou et al. | |
| 2020/0065541 A1 | 2/2020 | Jung et al. | |

OTHER PUBLICATIONS

Wertheim, et al., "The Critical Stage of Friction Ridge and Pattern Formation", Journal of Forensic Identification 52.1 (2002): 35-85.
Kücken, Michael, "Models for fingerprint pattern formation", Forensic Science international 171.2-3 (2007): 85-96.

* cited by examiner

FINGERPRINT SENSOR AND DISPLAY DEVICE INCLUDING THE SAME

CROSS-REFERENCE TO RELATED APPLICATION

The present application claims priority under 35 U.S.C. § 119(a) to Korean patent application 10-2019-0035098 filed on Mar. 27, 2019 in the Korean Intellectual Property Office, the disclosure of which is incorporated by reference herein in its entirety.

BACKGROUND

1. Technical Field

The present invention relates to a fingerprint sensor and a display device including the same.

2. Related Art

Recently, as display devices such as smart phones and tablet PCs are used in many fields, a biometric authentication method using a fingerprint of a user, and the like has been widely used. In order to provide a fingerprint sensing function, a fingerprint sensor may be built in or attached to a display device.

The fingerprint sensor may be configured as, for example, a photosensitive type fingerprint sensor. The photosensitive type fingerprint sensor may include a light source, a lens, and a photo sensor array. When a high-density photo sensor array is disposed on the entire display device to read the fingerprint of a user, manufacturing cost of the display device may be unnecessarily increased.

SUMMARY

The present disclosure provides a photosensitive type fingerprint sensor configured to complexly use a high-resolution fingerprint sensor and a low-resolution fingerprint sensor, and a display device including the photosensitive type fingerprint sensor.

According to an exemplary embodiment of the present invention, there is provided a fingerprint sensor including a base substrate having a first sensing region and a second sensing region, a plurality of first photo sensors disposed on the first sensing region, and a plurality of second photo sensors disposed on the second sensing region. The first sensing region has an area larger than that of the second sensing region. The second photo sensors have an arrangement density higher than that of the first photo sensors Each of the first photo sensors has a width wider than that of each of the second photo sensors.

The width of each of the first photo sensors is about 30 μm to about 100 μm, and the width of each the second photo sensor is about 0.1 μm to about 10 μm.

Each of the first photo sensors includes a switching transistor and a first photoelectric device connected to one electrode of the switching transistor.

Each of the second photo sensor includes a circuit layer, a second photoelectric device disposed on the circuit layer, and a color filter layer and a lens layer, which are disposed on the second photoelectric device.

Each of the first photoelectric device and the second photoelectric device is a silicon-based photo diode, and each of the second photo sensors is a complementary metal-oxide-semiconductor (CMOS) image sensor.

The base substrate further includes a first region surrounding the first sensing region and the second sensing region. No photo sensor is provided in the first region.

The first sensing region and the second sensing region are spaced apart from each other, and the base substrate further includes a second region between the first sensing region and the second sensing region. No photo sensor is provided in the second region.

The fingerprint sensor further includes a fingerprint detector disposed on the base substrate, the fingerprint detector being disposed in the first region. The fingerprint detector includes a vertical fingerprint detector disposed adjacent to a long side of the base substrate and a horizontal fingerprint detector disposed adjacent to a short side of the base substrate.

The vertical fingerprint detector includes a first vertical fingerprint detector and a second vertical fingerprint detector. The first vertical fingerprint detector is electrically connected to the first photo sensors, and the second vertical fingerprint detector is electrically connected to the second photo sensors.

The fingerprint sensor may further include first driving signal lines, second driving signal lines and detection signal lines, which are disposed on the base substrate. The first driving signal lines are electrically connected to the first vertical fingerprint detector and the first photo sensors, and the second driving signal lines are electrically connected to the second vertical fingerprint detector and the second photo sensors. The detection signal lines are electrically connected to the first photo sensors, the second photo sensors, and the horizontal fingerprint detector.

The base substrate further includes a third sensing region spaced apart from the first sensing region. The second sensing region is located between the first sensing region and the third sensing region. The third sensing region includes the first photo sensors.

The base substrate includes a fourth sensing region spaced apart from the second sensing region. The first sensing region may be located between the second sensing region and the fourth sensing region. The fourth sensing region includes the second photo sensors.

The fingerprint sensor may further include a fingerprint detector disposed on the base substrate. The fingerprint detector includes a first vertical fingerprint detector electrically connected to the first photo sensors and a second vertical fingerprint detector electrically connected to the second photo sensors. The first vertical fingerprint detector is disposed in the first region, and the second vertical fingerprint detector is disposed in the second sensing region.

The fingerprint detector includes a horizontal fingerprint detector. The horizontal fingerprint detector is disposed in the second sensing region, and electrically connected to the first photo sensors and the second photo sensors.

The second photo sensors, the second vertical fingerprint detector, and the horizontal fingerprint detector are integrated to constitute a photo sensor module. The photo sensor module is attached onto the base substrate.

According to an exemplary embodiment of the present invention, there is provided a display device including a display panel having a plurality of pixels formed therein, and a fingerprint sensor disposed on the display panel. The fingerprint sensor includes a base substrate having a first sensing region and a second sensing region, a first photo sensor disposed on the first sensing region, and a second photo sensor disposed on the second sensing region. The first sensing region has an area larger than that of the second sensing region. Each of the first photo sensors has a width wider than that of each of the second photo sensors.

The display panel includes a display region and a non-display region. The display region includes the pixels. The display region overlap the first sensing region and the second sensing region. An arrangement density of the second photo sensors is different from an arrangement density of the first photo sensors.

The arrangement density of the second photo sensors is greater than that of the pixels, and the arrangement density of the pixels is greater than that of the first photo sensors.

Each of the pixels includes a light emitting device. At least one of the first photo sensors overlaps a corresponding pixel. At least one of the second photo sensors overlaps a corresponding pixel.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

DETAILED DESCRIPTION

Figure 1:
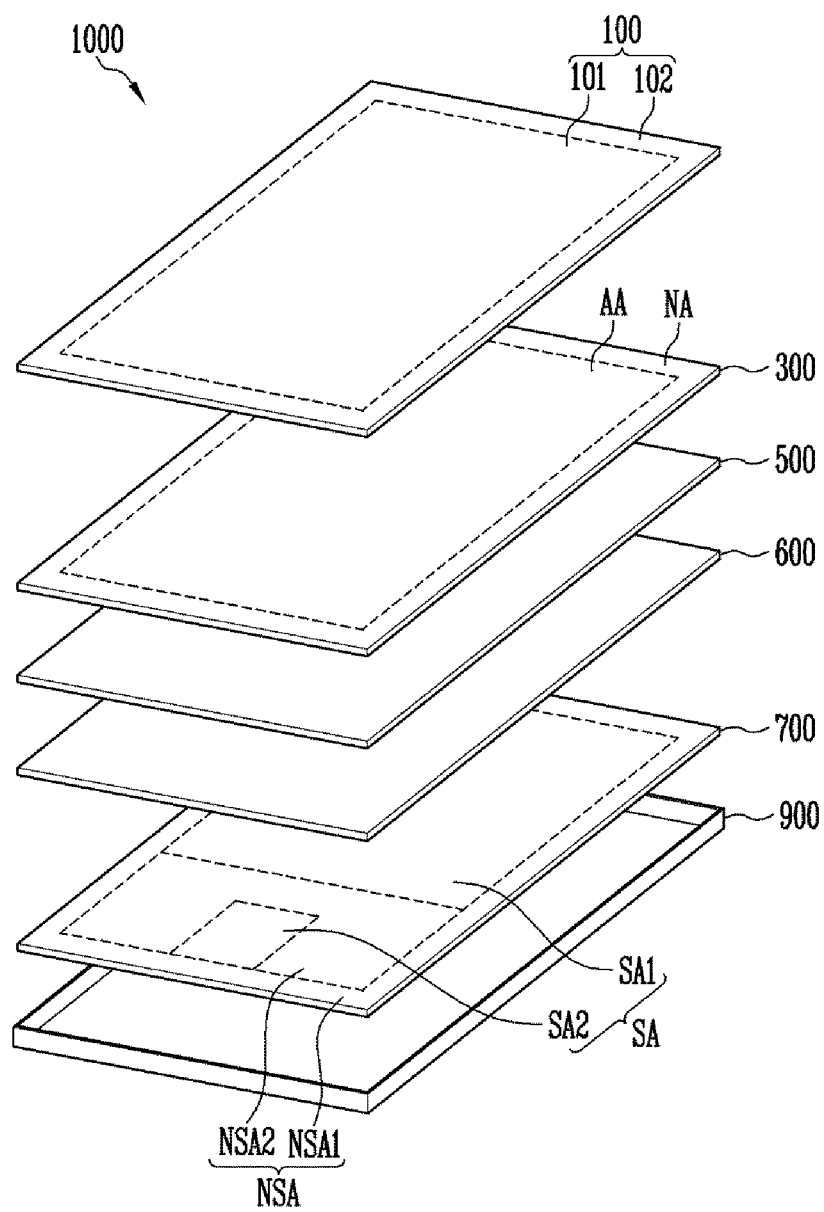
FIG. 1 is an exploded perspective view of a display device in accordance with an exemplary embodiment of the present invention.

The effects and characteristics of the present invention and a method of achieving the effects and characteristics will be clear by referring to the embodiments described below in detail together with the accompanying drawings. However, the present invention is not limited to the embodiments disclosed herein but may be implemented in various forms. The embodiments are provided by way of example only so that a person of ordinary skilled in the art may fully understand the features in the present invention and the scope thereof. Therefore, the present invention is defined by the scope of the appended claims.

The term "on" that is used to designate that an element or layer is on another element or layer includes both a case where an element or layer is located directly on another element or layer, and a case where an element or layer is located on another element or layer via still another element layer. In the entire description of the present invention, the same drawing reference numerals are used for the same elements across various figures.

Although the terms "first," "second," and the like are used for describing various components, these components are not confined by these terms. These terms are merely used for distinguishing one component from the other components. Therefore, a first component may be a second component or vice versa according to the technical concepts of the present invention.

Hereinafter, exemplary embodiments will be described with reference to the accompanying drawings.

FIG. 1 is an exploded perspective view of a display device 1000 in accordance with an embodiment of the present invention.

Referring to FIG. 1, the display device 1000 in accordance with the embodiment of the present invention includes a window 100, a touch panel 300, a display panel 500, a sensing panel 700, and a bracket 900.

The window 100 includes a light transmitting part 101 through which light provided by the display panel 500 is transmitted and a light blocking part 102 adjacent to the light transmitting part 101. The window 100 is disposed at an upper side of the display panel 500. The window 100 may be made of a material including glass, sapphire, plastic, and the like.

The touch panel 300 is located between the window 100 and the display panel 500. The touch panel 300 may include an input sensing layer. The input sensing layer may operate using a resistive film method, a capacitance method, or an electromagnetic induction method, and acquire coordinate information of a point at which a touch event occurs. The touch panel 300 is separately disposed on the display panel 500 to be coupled with the display panel 500. However, the present invention is not limited thereto, and the touch panel 300 may be integrally formed on the display panel 500.

The display panel 500 is disposed at a lower side of the touch panel 300. The display panel 500 includes a display region AA and a non-display region NA. The display region AA is a region in which an image is displayed, and overlaps the light transmitting part 101 of the window 100. The non-display region NA is a region in which the image is not displayed, and is adjacent to the display region AA. The non-display region NA overlaps the light blocking part 102 of the window 100.

In an embodiment, the display panel 500 may be a display panel including a self-luminescent device. In an example, the display panel 500 may be a display panel including an organic light emitting diode in which an emitting layer is configured as an organic emitting layer or a display panel including a quantum dot light emitting diode in which an emitting layer is configured as a quantum dot emitting layer. Hereinafter, a case where the display panel 500 is a display panel including an organic light emitting diode is described as an example.

The sensing panel 700 is located at a lower side of the display panel 500, and be attached to a lower surface of the display panel 500 through a separate coupling layer (not shown). The coupling layer may be a transparent adhesive layer. In an example, the coupling layer may be an Optically Clear Adhesive (OCA), a Pressure Sensitive Adhesive (PSA), or an Optically Clear Resin (OCR).

The sensing panel 700 includes a sensing region SA and a non-sensing region NSA. The sensing region SA overlaps the above-described display region AA. The sensing region SA may be a region that includes a plurality of optical fingerprint sensors and recognizes a fingerprint of a user. The sensing region SA includes a first sensing region SA1 and a second sensing region SA2. The first sensing region SA1 may be a region that occupies a majority of the sensing panel 700. The second sensing region SA2 is disposed adjacent to one side of the sensing panel 700, and has an area smaller than the first sensing region SA.

The non-sensing region NSA is a region surrounding the sensing region SA. The non-sensing region NSA may be a region in which the fingerprint of the user is not recognized. The non-sensing region NSA includes a first non-sensing region NSA1 and a second non-sensing region NSA2. The first non-sensing region NSA1 is a region disposed along an edge of the display panel 500 (or the sensing panel 700), and overlap the non-display region NA of the display panel 500. The second non-sensing region NSA2 is a region surrounding the second sensing region SA2, and overlaps at least a portion of the display region AA of the display panel 500.

The bracket 900 is located at a lower side of the sensing pattern 700. The bracket 900 may fix and protect components of the display device 1000, such as the touch panel 300, the display panel 500, the sensing panel, and other various parts and circuits. For example, the bracket 900 may be configured as a coupling body including a synthetic resin material, a metallic material or a combination of different materials.

In various embodiments of the present invention, the display device 1000 further includes an optical system 600 for constituting a photosensitive type fingerprint sensor. The optical system 600 is disposed in the form of a separate film or panel between the display panel 500 and the sensing panel 700. However, the present invention is not limited thereto. For example, at least a portion of the optical system 600 may be integrally formed with the display panel 500. In an example embodiment, the display panel 500 may be a display panel integrated with an optical system including a pinhole array layer.

Figure 2:
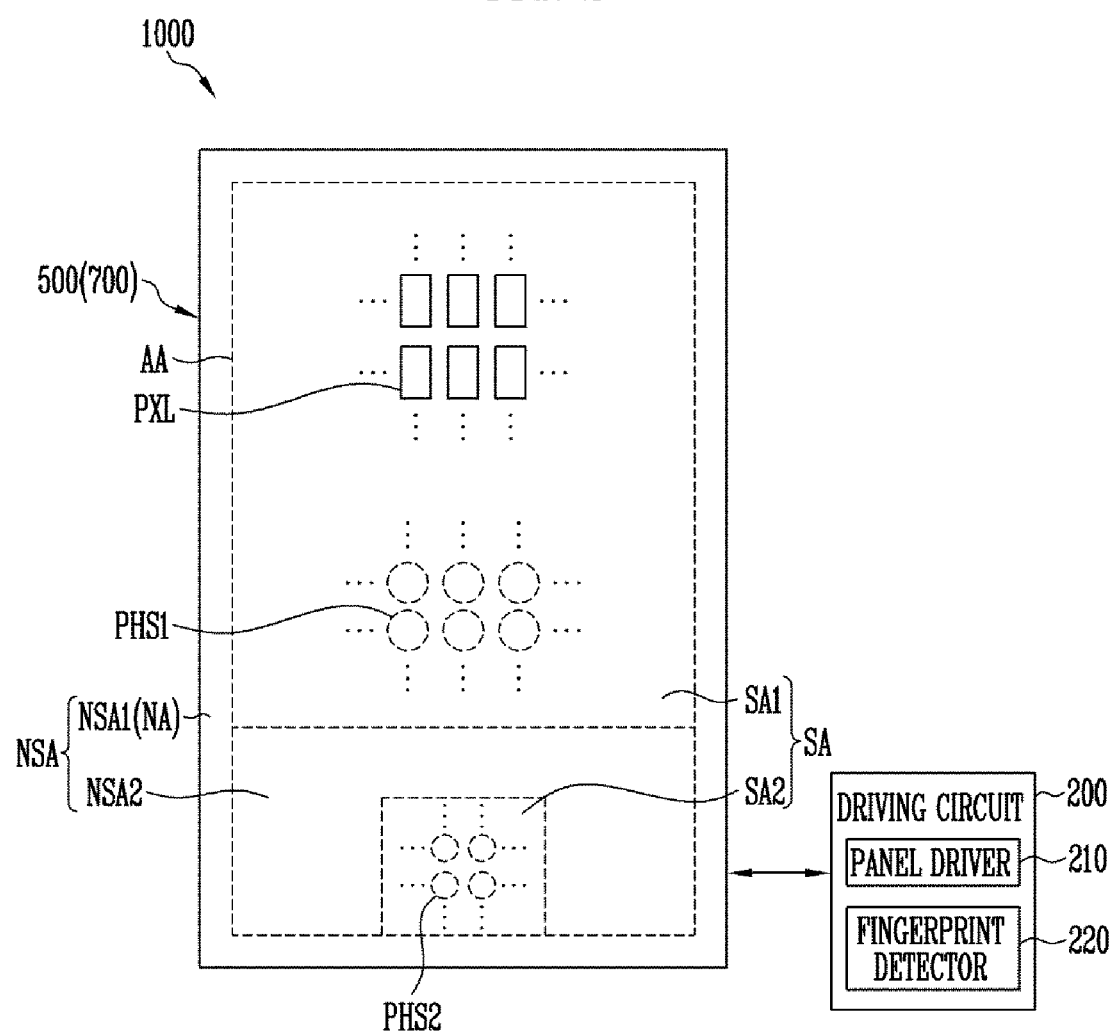
FIG. 2 is a plan view schematically illustrating a display device in accordance with an exemplary embodiment of the present invention.

FIG. 2 is a plan view schematically illustrating a display device in accordance with an embodiment of the present invention. More specifically, FIG. 2 is a view schematically illustrating a display panel 500, a sensing panel 700 disposed on the bottom of the display panel 500, and a driving circuit 200 for driving the display panel 500 and the sensing panel 700, which are provided in the display device 1000. For convenience of description, a case where the display panel 500 and the sensing panel 700 are separated from the driving circuit 200 is illustrated in FIG. 2, but the present invention is not limited thereto. For example, the whole or a portion of the driving circuit 200 may be integrally implemented on the display panel 500 or the sensing panel 700.

Further referring to FIG. 2 in conjunction with FIG. 1, the display device 1000 includes the display panel 500, the sensing panel 700, and the driving circuit 200. For convenience of description, unlike the display device 1000 shown in FIG. 1, only the display panel 500 and the sensing panel 700 are illustrated in FIG. 2.

As described above, the display panel 500 includes a display region AA and a non-display region NA. The display region AA is a region in which a plurality of pixels are provided, and may be referred to as an active region. In various embodiments, each of the pixels PXL may include at least one light emitting device. The display device 1000 drives the pixels PXL, corresponding to image data input from the outside, so that an image is displayed in the display region AA.

The non-display region NA is a region disposed at the periphery of the display region AA, and may be referred to as a non-active region. In various embodiments, the non-display region NA may collectively refer to the other region except the display region AA on the display panel 500. In an embodiment, the non-display region NA may include a line region, a pad region, various types of dummy regions, and the like.

The sensing panel 700 includes a sensing region SA and a non-sensing region NSA. The sensing region SA may include at least some pixels PXL among the pixels PXL provided in the display region AA. The sensing region SA may be a region for recognizing a fingerprint of a user. In an example embodiment, the sensing region SA includes a plurality of first photo sensors PHS1 and a plurality of second photo sensors PHS2. Photo sensors may also be referred to photosensors or photoelectric sensors.

The sensing region SA includes a first sensing region SA1 and a second sensing region SA2. Specifically, the first sensing region SA1 includes the first photo sensors PHS1, and the second sensing region SA2 includes the second photo sensors PHS2. For example, the first photo sensors PHS1 are disposed on the first sensing region SA1 and the second photo sensors PHS2 are disposed on the second sensing region SA2. The first sensing region SA1 has an area wider than that of the second sensing region SA2. In addition, the first sensing region SA1 and the second sensing region SA2 may be spaced apart from each other on a plane.

The first and second photo sensors PHS1 and PHS2 of the sensing panel 700 may sense light that is emitted from a light source and then reflected by a finger of a user, and sense a fingerprint of the user by analyzing the reflected light. Hereinafter, a case where the first and second photo sensors PHS1 and PHS2 are used for fingerprint sensing is described as an example in the present invention. However, in various embodiments, the first and second photo sensors PHS1 and PHS2 may be used for performing various functions, such as a touch sensor for sensing a touch input or a bio sensor for scanning skin of a human body.

The first and second photo sensors PHS1 and PHS2 may overlap at least some or all of the pixels PXL provided on the sensing area SA, or be disposed near the pixels PXL. For example, at least some or all of the first and second photo sensors PHS1 and PHS2 may be provided between the pixels PXL. Various embodiments of an arrangement relationship between the first and second photo sensors PHS1 and PHS2 and the pixels PXL will be described in more detail with reference to FIGS. 3A to 3C.

In an embodiment in which the first and second photo sensors PHS1 and PHS2 are provided adjacent to the pixels PXL, the first and second photo sensors PHS1 and PHS2 may use, as the light source, a light emitting device provided in at least one pixel PXL disposed on the sensing region SA. Therefore, the first and second photo sensors PHS1 and PHS2 along with pixels PXL on the sensing region SA, particularly, light emitting devices provided in the pixels PXL, may constitute a photosensitive type fingerprint sensor. When a display device having a fingerprint sensor built therein is configured using the pixels PXL as the light source without any separate external light source, the thickness of a module of the photosensitive type fingerprint sensor and the display device having the same may be decreased, and manufacturing cost of the display device may be reduced.

A sensing resolution of the first sensing region SA1 and a sensing resolution of the second sensing region SA2 may be different from each other. That is, arrangement densities (i.e., the number of photo sensors per unit area) of the first and second photo sensors PHS1 and PHS2 included in the first sensing region SA1 and the second sensing region SA2 respectively may be different from each other. For example, the first sensing region SA1 may be a low-resolution sensing region, and the second sensing region SA2 may be a high-resolution sensing region. The second photo sensors PHS2 of the second sensing region SA2 may have an arrangement density higher than that of the first photo sensors PHS1 of the first sensing region SA1.

Although an example in which two sensing regions SA1 and SA2 are formed on the display region AA is illustrated in FIG. 2, the present invention is not limited thereto. That is, in various embodiments, regularly or irregularly arranged three or more sensing regions may be formed on the display region AA. Therefore, a plurality of sensing regions may have the same area or shape, or have different areas and shapes. A detailed embodiment related to this will be described later.

In addition, although an example in which the sensing region SA is formed in at least a portion of the display region AA is illustrated in FIG. 2, the present invention is not limited thereto. In various embodiments, the display region AA and the sensing region SA may be provided to at least partially overlap each other. That is, a region in which any image is not displayed may provide fingerprint recognition.

The non-sensing region NSA is a region disposed at the periphery of the sensing region SA. In an example embodiment, the non-sensing region NSA may be a region in which no photo sensors such as the first and second photo sensors PHS1 and PHS2 are provided, so that any fingerprint recognition is not performed in the non-sensing region NSA. As described with reference to FIG. 1, the non-sensing region NSA includes a first non-sensing region NSA1 and a second non-sensing region NSA2, and the first non-sensing region NSA1 is disposed along an edge of the sensing panel 700. The first non-sensing region NSA1 may include a driver for driving the first and second photo sensors PHS1 and PHS2 disposed in the sensing region SA, or may include a pad part for connecting a driver disposed at the outside.

The second non-sensing region NSA2 surrounds the second sensing region SA2 and is formed between the first sensing region SA1 and the second sensing region SA2. For example, the first sensing region SA1 and the second sensing region SA2 are separated from each other by the second non-sensing region NSA2. The second non-sensing region NSA2 may include a connection line for connecting the first photo sensors PHS1 of the first sensing region SA1 and the second photo sensors PHS2 of the second sensing region SA2, a signal line for transferring a signal, and the like.

The driving circuit 200 may drive the display panel 500. For example, the driving circuit 200 may output a data signal corresponding to image data to the display panel 500, or output a driving signal for driving the first and second photo sensors PHS1 and PHS2 and receive a sensing signal from the first and second photo sensors PHS1 and PHS2. The driving circuit 200 receiving the sensing signal may detect a fingerprint shape of the user by using the sensing signal.

The display panel 500 and the sensing panel 700 may be electrically connected to the driving circuit 200 in the display device 1000. Although a case where the driving circuit 200 is separated from the display panel 500 and the sensing panel 700 is illustrated for convenience of description, the driving circuit 200 may be directly disposed on the display panel 500 or the sensing panel 700.

The driving circuit 200 includes a panel driver 210 and a fingerprint detector 220. Although a case where the panel driver 210 and the fingerprint detector 220 are separated from each other is illustrated in FIG. 2, the present invention is not limited thereto. In an example embodiment, at least a portion of the fingerprint detector 220 may be integrated with the panel driver 210, or operate as a part of the panel driver 210.

The panel driver 210 may supply a data signal corresponding to image data to the pixels PXL of the display region AA. The display panel 500 may display an image corresponding to the image data supplied from the panel driver 210.

In an embodiment, the panel driver 210 may supply a driving signal for fingerprint sensing to the pixels PXL. The driving signal may be provided to allow the pixels PXL to operate as a light source for the first and second photo sensors PHS1 and PHS2 by emitting light. Therefore, the driving signal for fingerprint sensing may be provided to pixels PXL provided in a specific region of the display panel 500, e.g., pixels PXL provided in the sensing region SA. In various embodiments, the driving signal for fingerprint sensing may be provided by the fingerprint detector 220.

The fingerprint detector 220 may transfer a driving signal to the first and second photo sensors PHS1 and PHS2, and detect a fingerprint of the user, based on the a sensing signal received from the first and second photo sensors PHS1 and PHS2.

In some embodiments, the driving circuit 200 may further include a main processor configured to receive a sensing signal detected from the fingerprint detector 220 and process the sensing signal when a detected fingerprint corresponds to the original fingerprint, etc.

Figure 3A:
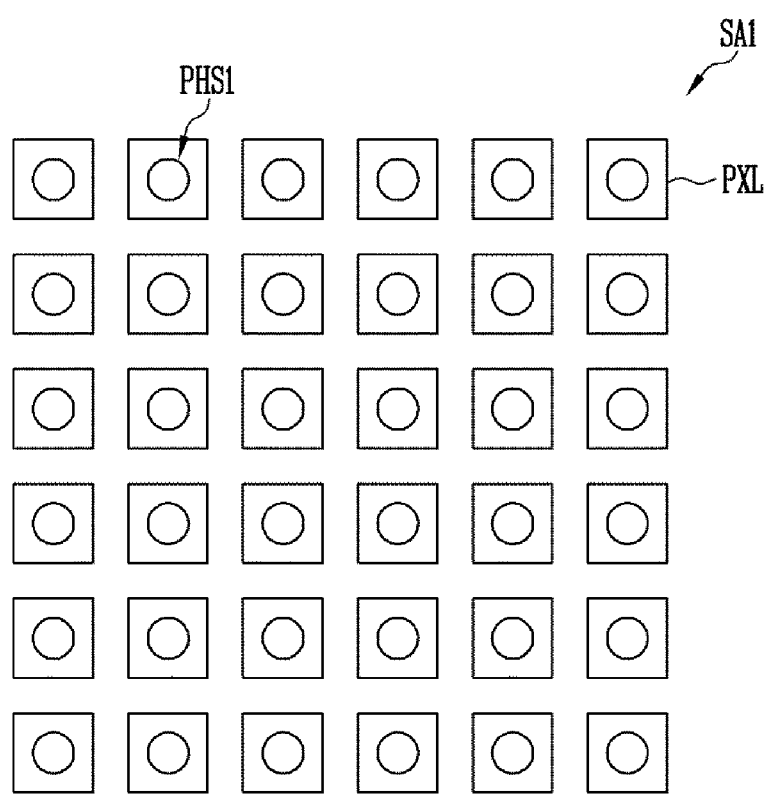
FIGS. 3A to 3C are plan views illustrating various exemplary embodiments of an arrangement structure of pixels and photo sensors in accordance with the present invention.
Figure 3B:
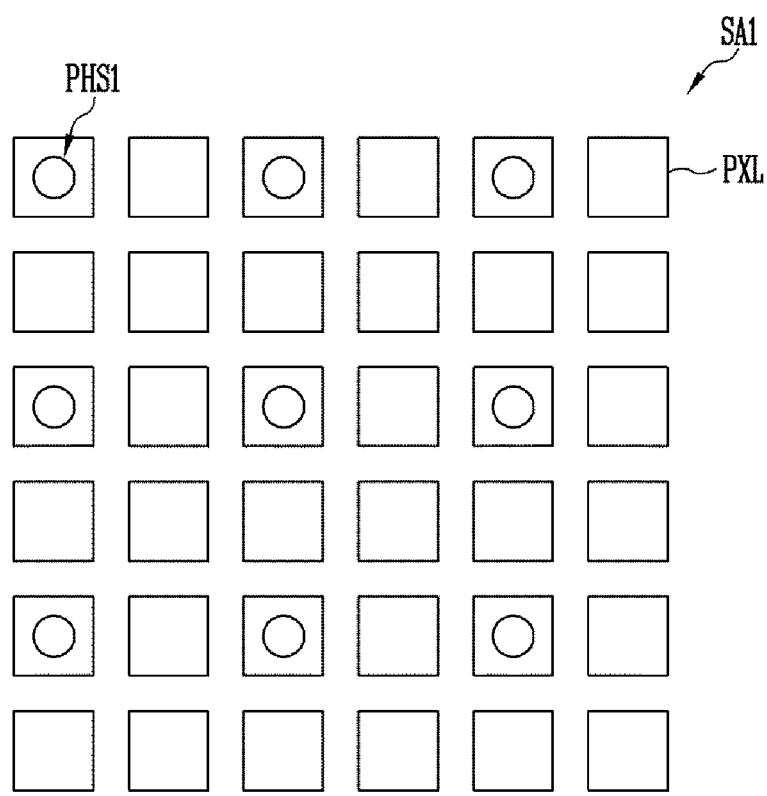
Figure 3C:
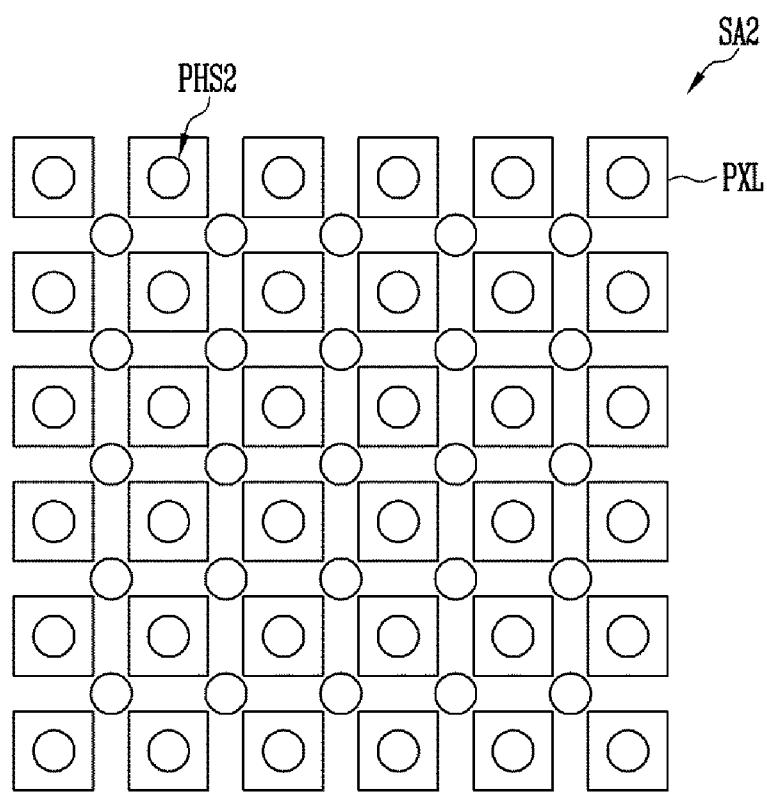

FIGS. 3A to 3C are plan views illustrating various embodiments of an arrangement structure of pixels and photo sensors. FIGS. 3A to 3C illustrate different embodiments of relative size, resolution, and arrangement relations between at least one pixel PXL and first and second photo sensors PHS1 and PHS2, which are provided in the sensing region SA. The pixels PXL may be arranged to entirely have a constant distance between two adjacent pixels in a matrix form with multiple rows and columns.

Referring to FIG. 3A, first photo sensors PHS1 may be arranged with a resolution (density) equal to that of pixels PXL in the first sensing region SA1. In other words, the first photo sensors PHS1 of which number is equal to that of the pixels PXL may be arranged in the first sensing region SA1. Therefore, the pixels PXL and the first photo sensors PHS1 may be arranged to form one-to-one pairs. In the embodiment shown in FIG. 3A, the pixels PXL and the first photo sensors PHS1 are arranged to overlap each other. In this case, an arrangement density of the first photo sensors PHS1 may be same as that of the pixels PXL. However, the present invention is not limited thereto. In an example embodiment, the pixels PXL and the first photo sensors PHS1 may be arranged not to overlap each other. In an example embodiment, the pixels PXL and the first photo sensors PHS1 may overlap each other in only a partial region. For example, the pixels PXL may overlap some of the first photo sensors PHS1, without overlapping the other first photo sensors PHS1.

Meanwhile, in the embodiment shown in FIG. 3A, the first photo sensors PHS1 have a size smaller than that of the pixels PXL, but the present invention is not limited thereto. In an example embodiment, the first photo sensors PHS1 may have a size equal to or larger than that of the pixels PXL.

Referring to FIG. 3B, first photo sensors PHS1 may be arranged with a resolution lower than that of pixels PXL in the first sensing region SA1. In other words, the first photo sensors PHS1 of which number is smaller than that of the pixels PXL may be arranged in the first sensing region SA1. In this case, an arrangement density of the first photo sensors PHS1 may be smaller than that of the pixels PXL. Although an example in which one first photo sensor is disposed per four pixels PXL is illustrated in FIG. 3B, the present invention is not limited thereto. When the first photo sensors PHS1 are arranged with a resolution lower than that of the pixels PXL, some or all of the first photo sensors PHS1 may be disposed to overlap the pixels PXL.

Referring to FIG. 3C, second photo sensors PHS2 may be arranged with a resolution higher than that of pixel PXL in the second sensing region SA2. In other words, the second photo sensors PHS2 of which number is greater than that of the pixels PXL may be arranged in the second sensing region SA2. For example, an arrangement density of the second photo sensors PHS2 may be greater than that of the pixels PXL.

Therefore, the second photo sensors PHS2 may have a size smaller than that of the pixels PXL as shown in FIG. 3C. In addition, when the second photo sensors PHS2 are disposed with a resolution higher than that of the pixels, at least some of the second photo sensors PHS2 may be disposed not to overlap the pixels PXL, or all the second photo sensors PHS2 may be disposed not to overlap the pixels PXL.

As described above, the first photo sensors PHS1 may be disposed with a resolution equal to or lower than that of the pixels PXL in the first sensing region SA1. In addition, the second photo sensors PHS2 may be disposed with a resolution higher than that of the pixels PXL in the second sensing region SA2. That is, the second photo sensors PHS2 in the second sensing region SA2 may have an arrangement density higher than that of the first photo sensors PHS1 in the first sensing region SA1. However, the arrangement densities of the first and second photo sensors PHS1 and PHS2 are not limited thereto. In an example embodiment, the first photo sensors PHS1 may be arranged to have an arrangement density higher than that of the pixels PXL, and be arranged to have an arrangement density lower than that of the second photo sensors PHS2.

In various embodiments of the present invention, the arrangement structure of the pixels PXL and the first and second photo sensors PHS1 and PHS2 is not limited to that described above. That is, the shapes, relative sizes, numbers, resolutions, etc. of the pixels PXL and the first and second photo sensors PHS1 and PHS2 in the sensing region SA may be variously changed within the scope of the present invention.

In addition, although examples in which the first and second photo sensors PHS1 and PHS2 are regularly arranged in the sensing region SA are illustrated in the FIGS. 3A to 3C, the present invention is not limited thereto. In an example embodiment, the first and second photo sensors PHS1 and PHS2 may be irregularly arranged in the sensing region SA.

Figure 4:
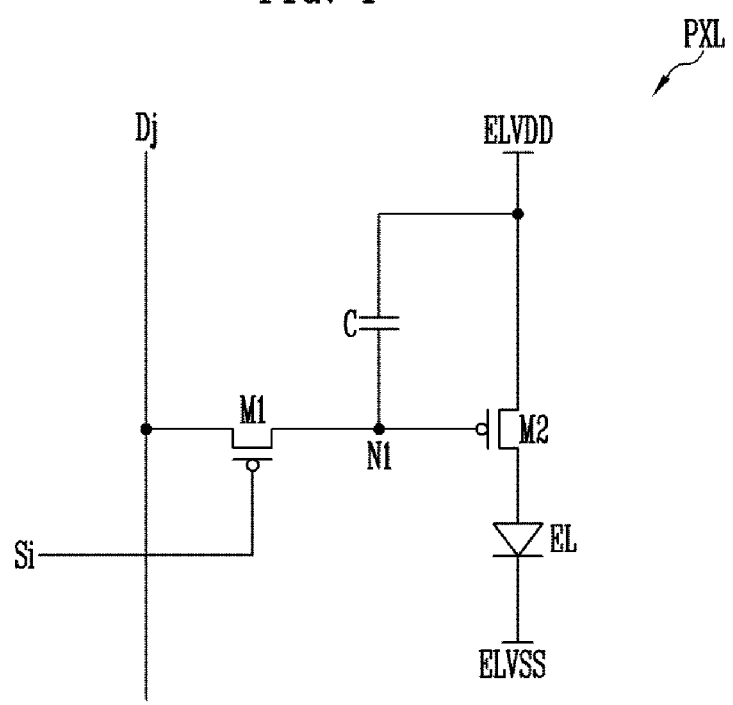
FIG. 4 is a circuit diagram illustrating an example of a pixel shown in FIG. 2 in accordance with the present invention.

FIG. 4 is a circuit diagram illustrating an example of the pixel shown in FIG. 2. For convenience of description, an active pixel that is connected to an ith (i is a natural number) scan line Si disposed on an ith horizontal pixel column and a jth (j is a natural number) data line Dj disposed on a jth vertical pixel column and includes two transistors is illustrated in FIG. 4. However, in the present invention, the structure of the pixel PXL is not limited to that shown in FIG. 4.

Referring to FIG. 4, the pixel in accordance with the embodiment of the present invention includes a first transistor M1, a second transistor M2, a capacitor C, and a light emitting device EL. The light emitting device EL may be an Organic Light Emitting Diode (OLED).

The first transistor M1 is connected to the data line Dj and a first node N1, and a gate electrode of the first transistor M1 is connected to the scan line Si. The first transistor M1 is turned on when a scan signal having a gate-on voltage (e.g., a low voltage) is supplied from the scan line Si. When the first transistor M1 is turned on, the data line Dj and the first node N1 may be electrically connected to each other.

The second transistor M2 is connected between a first power source ELVDD and the light emitting device EL, and a gate electrode of the second transistor M2 is connected to the first node N1. The second transistor M2 controls an amount of current supplied from the first power source ELVDD to a second power source ELVSS via the light emitting device EL, corresponding to a voltage of the first node N1. In various embodiments, the first power source ELVDD may be a high-potential pixel power source, and the second power source ELVSS may be a low-potential pixel power source.

The capacitor C is connected between the first power source ELVDD and the first node N1. The capacitor C may store a voltage corresponding to a data signal supplied to the first node N1.

The light emitting device EL is connected between the second transistor M2 and the second power source ELVSS. The light emitting device EL may emit light with a luminance corresponding to the current controlled by the second transistor M2.

Figure 5:
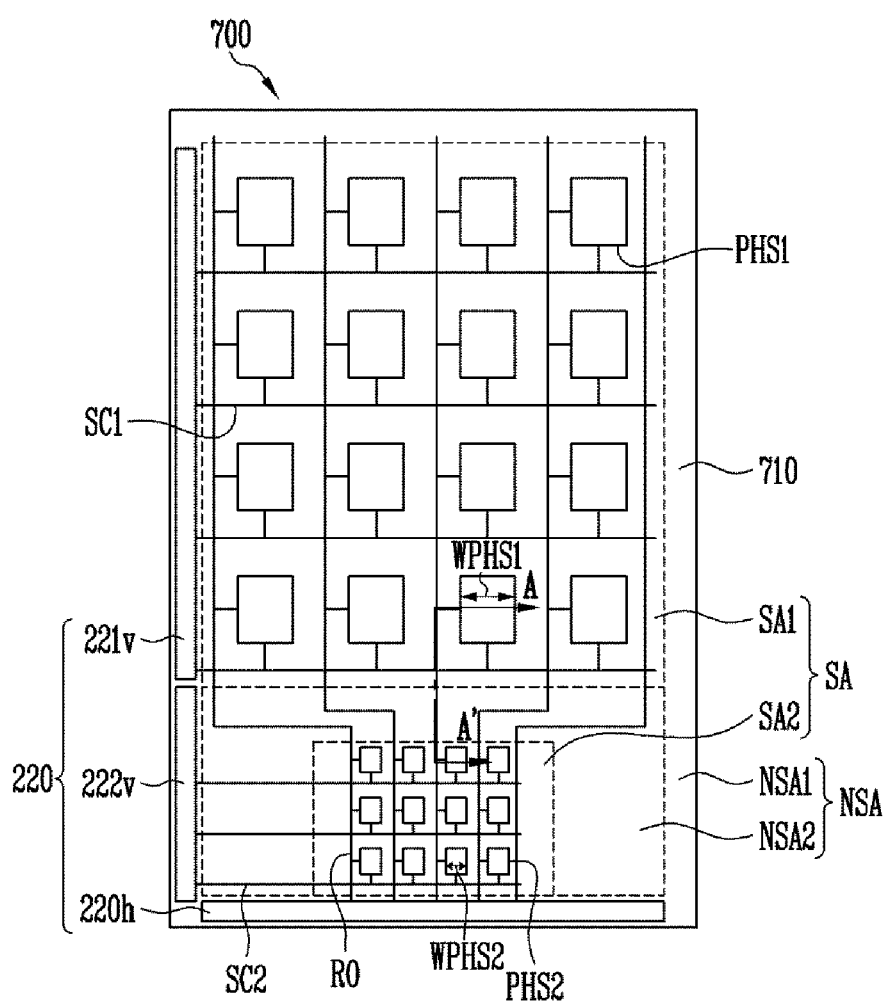
FIG. 5 is a plan view schematically illustrating a sensing panel in accordance with an exemplary embodiment of the present invention.

FIG. 5 is a plan view schematically illustrating a sensing panel in accordance with an embodiment of the present invention.

Referring to FIG. 5, the sensing panel 700 includes a base substrate 710, first and second photo sensors PHS1 and PHS2 arranged on the base substrate 710, a fingerprint detector 220, and a plurality of signal lines SC1, SC2, and RO.

The base substrate 710 may be made of an insulating material such as glass, quartz or polymer resin, and provide a space in which components of the sensing panel 700 are disposed. The base substrate 710 may be a rigid substrate or a flexible substrate.

The first photo sensors PHS1 may be located in a first sensing region SA1, and the second photo sensors PHS2 may be located in a second sensing region SA2. The first and second photo sensors PHS1 and PHS2 may be arranged on the base substrate 710 while forming rows and columns at a certain distance.

The first photo sensors PHS1 may have an arrangement density lower than that of the second photo sensors PHS2. That is, a number of first photo sensors PHS1 disposed in the same area may be smaller than that of second photo sensors PHS2 disposed in the same area. In addition, each of the first photo sensors PHS1 has a first width wPHS1 per unit sensor, which is wider than a second width wPHS2 of each of the second photo sensors PHS2. In other words, each of the first photo sensors PHS1 may have a size larger than that of each of the second photo sensors PHS2. For example, the first width wPHS1 may be about 30 μm to about 100 μm, and the second width wPHS2 may be about 0.1 μm to about 10 μm. The term of "about" may reflect deviation in sizes in forming the first and second photo sensors PHS1 and PHS2 without significantly altering the operation, functionality, and/or structure thereof. For example, 0%-5% deviation around the listed values may be considered as being within the listed range.

The fingerprint detector 220 is disposed in a first non-sensing region NSA1 of the sensing panel 700. The fingerprint detector 220 includes a first vertical fingerprint detector 221v, a second vertical fingerprint detector 222v, and a horizontal fingerprint detector 220h.

The first vertical fingerprint detector 221v and the second vertical fingerprint detector 222v are formed adjacent to one long side of the base substrate 710, and are disposed in a vertical direction (i.e., a direction parallel to the one long side). For example, the first vertical fingerprint detector 221v and the second vertical fingerprint detector 222v are formed along the one long side of the base substrate 710. The present invention is not limited thereto. In an example embodiment, the first vertical fingerprint detector 221v and the second vertical fingerprint detector 222v may be formed along opposite long sides of the base substrate 710. The horizontal fingerprint detector 220h is formed adjacent to one short side of the base substrate 710, and is disposed in a horizontal direction (i.e., a direction vertical to the one long side).

The first vertical fingerprint detector 221v and the second vertical fingerprint detector 222v may transfer a driving signal to the first and second photo sensors PHS1 and PHS2. The first vertical fingerprint detector 221v may transfer a driving signal to the first photo sensor PHS1, and the second vertical fingerprint detector 222v may transfer driving signals to the second photo sensors PHS2. The driving signals for driving the first and second photo sensors PHS1 and PHS2 may be different from each other. For example, a number of kinds of driving signals for driving the second photo sensors PHS2 may be greater than that of kinds of driving signals for driving the first photo sensors PHS1.

The first vertical fingerprint detector 221v and the second vertical fingerprint detector 222v may be individually formed as shown in FIG. 5. However, the present invention is not limited thereto. In an example embodiment, the first vertical fingerprint detector 221v and the second vertical fingerprint detector 222v may be integrated as one vertical fingerprint detector.

The first vertical fingerprint detector 221v and the second vertical fingerprint detector 222v may be connected to a plurality of driving signals SC1 and SC2 for transferring a driving signal.

The driving signal lines SC1 and SC2 may be disposed on the base substrate 710, and be disposed to extend in the horizontal direction. That is, the driving signal lines SC1 and SC2 may be disposed along rows of the first and second photo sensors PHS1 and PHS2.

The driving signal lines SC1 and SC2 may include first driving signal lines SC1 and second driving signal lines SC2. The first vertical fingerprint detector 221v and the first photo sensors PHS1 may be electrically connected through the first driving signal lines SC1. The second vertical fingerprint detector 222v and the second photo sensors PHS2 may be electrically connected through the second driving signal lines SC2.

The horizontal fingerprint detector 220h may receive sensing signals from the first and second photo sensors PHS1 and PHS2, and may include an Analog-Digital Converter (ADC) for converting the received sensing signals into digital signals, an amplifier for amplifying the sensing signals, and a noise reduction device for removing noise of the sensing signals. Also, the horizontal fingerprint detector 220h may further include a signal transfer part for transferring a signal-processed sensing signal to another component (e.g., a main processor).

In the above-described embodiment and embodiments which will be described below, a case where the horizontal fingerprint detector 220h is electrically connected to the first and second photo sensors PHS1 and PHS2, but the present invention is not limited thereto. In some embodiments, the sensing panel 700 may include a first horizontal fingerprint detector connected to the first photo sensors PHS1 and a second horizontal fingerprint detector connected to the second photo sensors PHS2. The first horizontal fingerprint detector may not be electrically connected to the second photo sensors PHS2, and the second horizontal fingerprint detector may not be electrically connected to the first photo sensors PHS1.

The horizontal fingerprint detector 220h may be connected to a plurality of detection signal lines RO for receiving sensing signals. The detection signal lines RO may be disposed on the base substrate 710, and be disposed to extend in the vertical direction. That is, the detection signal lines RO may be roughly disposed along columns of the first and second photo sensors PHS1 and PHS2, and be orthogonal to the driving signal lines SC1 and SC2 disposed along the rows of the first and second photo sensors PHS1 and PHS2 on a plane.

The detection signal lines RO may be connected to the first photo sensor PHS1 and the second photo sensor PHS2. The first and second photo sensors PHS1 and PHS2 disposed on the same column may be electrically connected to one detection signal line of the detection signal lines RO. For example, a first photo sensor PHS1 of an nth (n is a natural number) column and a second photo sensor PHS2 of the nth column among first and second photo sensors PHS1 and PHS2 arranged in a plurality of columns may be electrically connected through one detection signal line RO.

The detection signal line RO disposed in the first sensing region SA1 and the detection signal line RO disposed in the second sensing region SA2 may be connected to each other in a second non-sensing region NSA2. Since the arrangement densities of the first and second photo sensors PHS1 and PHS2 are different from each other, the detection signal lines RO in the first sensing region SA1 and the detection signal lines RO in the second sensing region SA2 may have different arrangement densities. Accordingly, the detection signal line RO may include a bent part in the second non-sensing region NSA2 to connect the detection signal line RO disposed in the first sensing region SA1 and the detection signal line RO disposed in the second sensing region SA2 to each other.

Although not shown for convenience of description, the fingerprint detector 220 may further include a power supply (not shown) for supplying power to the first and second photo sensors PHS1 and PHS2. The power supply may be disposed in the first non-sensing region NSA1. For example, the power supply may be disposed adjacent to one short side of the base substrate 710. The power supply may supply power to the first and second photo sensors PHS1 and PHS2 through a power line (not shown) disposed on the base substrate 710.

Hereinafter, an operation principle of each of the first and second photo sensors PHS1 and PHS2 will be described in detail through circuit diagrams of the first photo sensor PHS1 and the second photo sensor PHS2 with further reference to FIGS. 6 and 7.

Figure 6:
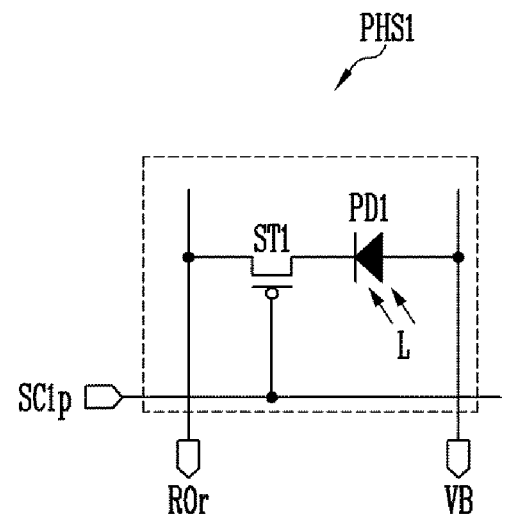
FIG. 6 is a circuit diagram of a first photo sensor in accordance with an exemplary embodiment of the present invention.

FIG. 6 is a circuit diagram of a first photo sensor in accordance with an embodiment of the present invention. FIG. 7 is a circuit diagram of a second photo sensor in accordance with an embodiment of the present invention. FIGS. 6 and 7 illustrate a circuit diagram of an arbitrary photo sensor among a plurality of photo sensors.

Referring to FIG. 6, the first photo sensor PHS1 includes a first photoelectric device PD1 and a switching transistor ST1. The first photo sensor PHS1 may be disposed on a pth first photo sensor row to be connected to a pth first driving signal line SC1p, and be disposed on an rth first photo sensor column to be connected to an rth detection signal line ROr.

The first photoelectric device PD1 may be a silicon-based photo diode such as a PN-type photo diode, a PIN-type photo diode, a Schottky diode, or an Avalanche diode. Hereinafter, a case where the first photoelectric device PD1 is implemented with a PIN-type photo diode is described.

The first photo sensor PHS1 in accordance with this embodiment includes a one transistor (1T)-one diode (1D) structure including one switching transistor ST1 and one first photoelectric device PD1.

The first photo sensor PHS1 may generate an electrical signal corresponding to light reflected by a ridge of a fingerprint, or generate an electrical signal corresponding to light reflected by a valley between ridges of the fingerprint. An amount of light sensed by the first photoelectric device PD1 may vary depending on the shape of a fingerprint.

One electrode of the switching transistor ST1 is connected to the first photoelectric device PD1, the other electrode of the switching transistor ST1 is connected to the detection signal line ROr, and a gate electrode of the switching transistor ST1 is connected to the first driving signal line SC1p. When light L reflected by a fingerprint is incident onto the first photoelectric device PD1, a voltage may be generated in the first photoelectric device PD1 according to an amount of the light L.

An amount of drain current passing through a channel of the switching transistor ST1 may vary depending on the voltage generated in the first photoelectric device PD1. When a driving signal is applied through the first driving signal line SC1p, the switching transistor ST1 may be turned on, and a sensing signal may be detected through the detection signal line ROr connected to the other electrode of the switching transistor ST1. The sensing signal may include brightness information or image information of the fingerprint, and determine whether a region corresponding to the first photo sensor PHS1 is a ridge or valley of the fingerprint through a processing operation on the electrical signal. The entire fingerprint image may be configured by combining information determined by arranged first photo sensors PHS1.

Figure 7:
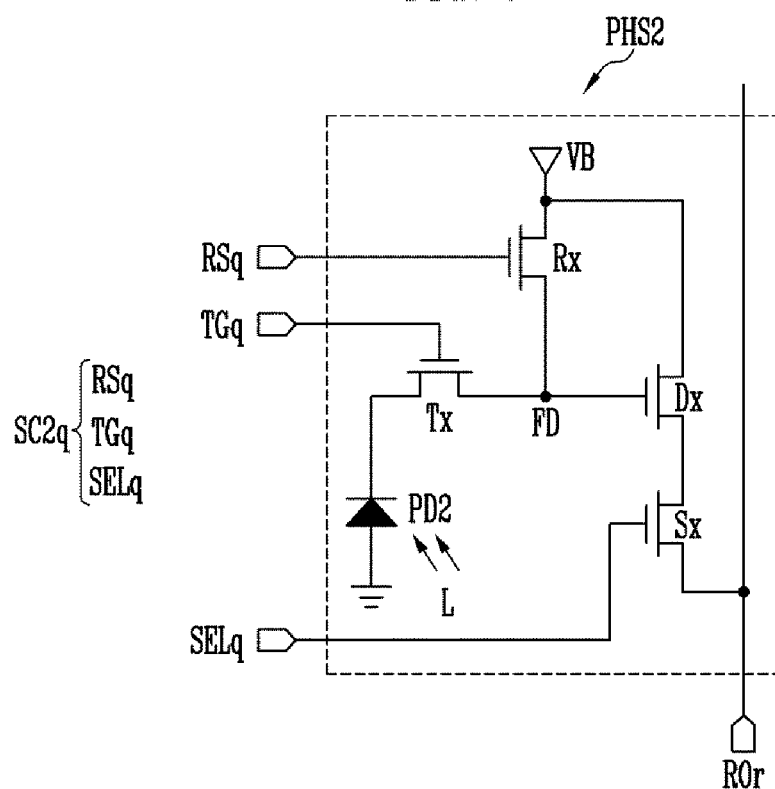
FIG. 7 is a circuit diagram of a second photo sensor in accordance with an exemplary embodiment of the present invention.

Referring to FIG. 7, the second photo sensor PHS2 may include a plurality of transistors Tx, Rx, Dx, and Sx and a second photoelectric device PD2. The second photo sensor PHS2 may be disposed on a qth second photo sensor row to be connected to a qth second driving signal line SC2q, and be disposed on an rth second photo sensor column to be connected to an rth detection signal line ROr.

The four transistors Tx, Rx, Dx, and Sx include a transfer transistor Tx that transfers signal charges generated in the second photoelectric device PD2 to a floating diffusion region FD, a reset transistor Rx that periodically resets charges stored in the floating diffusion region FD, a drive transistor Dx that serves as a source follower buffer amplifier and buffers a signal according to the charges stored in the floating diffusion region FD, and a select transistor Sx that performs switching and addressing functions for selecting the second photo sensor PHS2.

A first signal line RSq may be connected to a gate electrode of the reset transistor Rx. When a reset signal is applied through the first signal line RSq, the reset transistor Rx may be turned on, and a reset voltage may be applied from a power line VB such that a voltage storage in the floating diffusion region FD is reset.

A second signal line TGq may be connected to a gate electrode of the transfer transistor Tx. When a driving signal is applied through the second signal line TGq, the transfer transistor Tx may be turned on, and a sensing signal sensed by the second photoelectric device PD2 may be stored in the floating diffusion region FD.

The floating diffusion region FD may be connected to a gate electrode of the drive transistor Dx. The drive transistor Dx may be turned on according to a voltage of the floating diffusion region FD. The magnitude of current passing through the drive transistor Dx may vary depending on the magnitude of a voltage.

A third signal line SELq may be connected to a gate electrode of the select transistor Sx. When a select signal is applied through the third signal line SELq, the current passing through the drive transistor Dx may pass through the select transistor Sx.

The detection signal line ROr may be connected to one electrode of the select transistor Sx. The magnitude of the voltage stored in the floating diffusion region FD varies depending on an amount of light L incident onto the second photoelectric device PD2, and the magnitude of the current passing through the drive transistor Dx and the select transistor Sx varies depending to the magnitude of the voltage of the floating diffusion region FD. The current passing through the select transistor Sx may be transferred to the fingerprint detector 220 shown in FIG. 2 through the detection signal line ROr.

The configuration of the second photo sensor PHS2 is not limited thereto. In an example embodiment, the second photo sensor PHS2 may include transistors of which number is greater than that in the above-described embodiment, or include transistors of which number is smaller than that in the above-described embodiment.

The first photo sensor PHS1 shown in FIG. 6 and the second photo sensor PHS2 shown in FIG. 7 may be electrically connected through the same detection signal ROr.

As described above, in this embodiment, the first photo sensor PHS1 may be a thin film transistor (TFT) image sensor having a 1T-1D (one transistor-one diode) structure, and the second photo sensor PHS2 may be a Complementary Metal-Oxide-Semiconductor (CMOS) image sensor (CIS) including a COMS.

Figure 8:
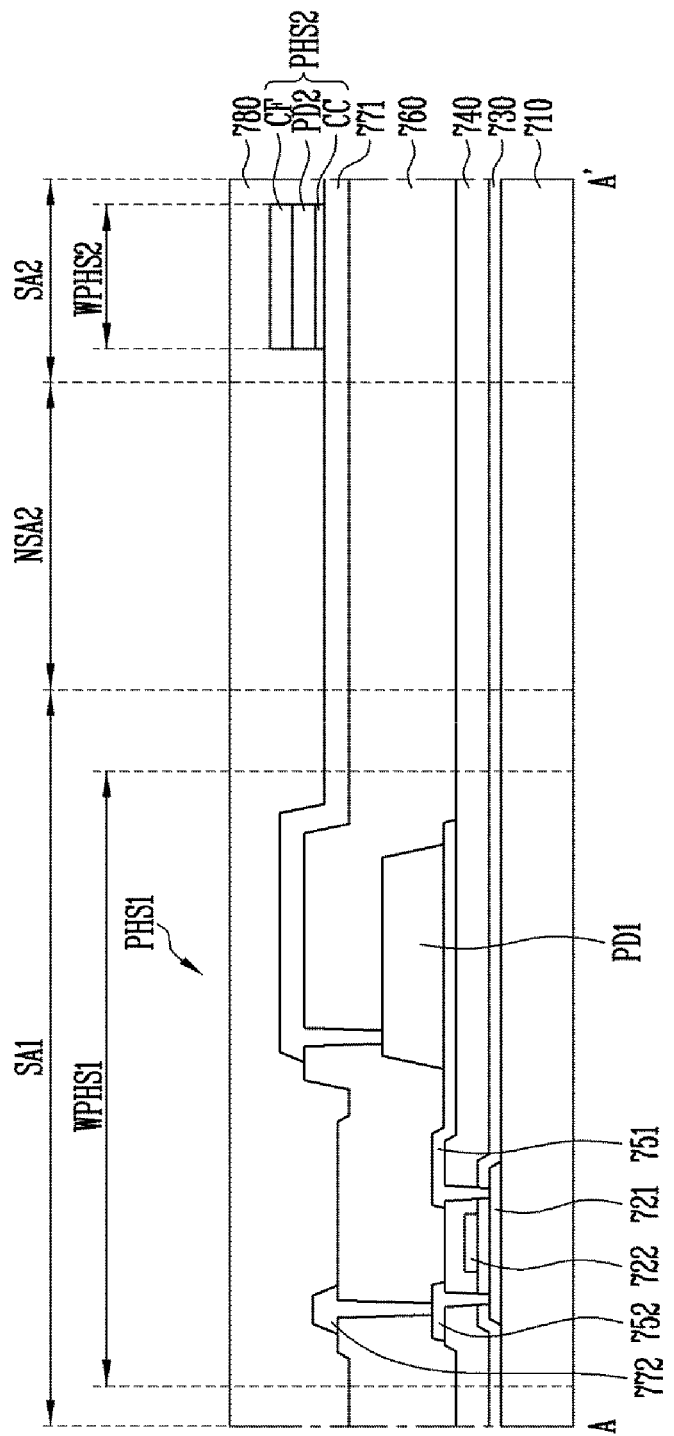
FIG. 8 is a sectional view of the sensing panel taken along line A-A' shown in FIG. 5 in accordance with an exemplary embodiment of the present invention.

FIG. 8 is a sectional view of the sensing panel taken along line A-A' shown in FIG. 5.

Referring to FIG. 8, the sensing panel 700 includes a base substrate 710, a first photo sensor PHS1 disposed on the base substrate 710, and a second photo sensor PHS2.

The first photo sensor PHS1 may include a thin film transistor and a first photoelectric device PD1 electrically connected to the thin film transistor.

The thin film transistor may be formed on one surface of the base substrate 710. The thin film transistor may include an active layer 721, a gate electrode 722, a first electrode 751, and a second electrode 752.

Although a case where the thin film transistor is formed in an upper gate (top gate) type in which the gate electrode 722 is located on the top of the active layer 721 is illustrated in FIG. 8, the present invention is not limited thereto. In an example embodiment, the thin film transistor may be formed in a lower gate (bottom gate) type in which the gate electrode 722 is located on the bottom of the active layer 721 or in a double gate type in which the gate electrode 722 is located on both the top and bottom of the active layer 721.

The active layer 721 is formed on the base substrate 710. The active layer 721 may include polycrystalline silicon, single crystalline silicon, low temperature polycrystalline silicon, amorphous silicon, or oxide semiconductor. For example, the oxide semiconductor may include a binary compound (ABx), a ternary compound (ABxCy), or a quaternary compound (ABxCyDz), and/or the like, which contain indium (In), zinc (Zn), gallium (Ga), tin (Sn), titanium (Ti), aluminum (Al), hafnium (Hf), zirconium (Zr), magnesium (Mg), and/or the like. For example, the active layer 721 may include ITZO (oxide including indium, tin, and titanium) or IGZO (oxide including indium, gallium, and tin).

A first insulating layer 730 is formed over the active layer 721. The first insulating layer 730 may be formed of an inorganic layer, e.g., a silicon nitride layer, a silicon oxynitride layer, a silicon oxide layer, a titanium oxide layer, or an aluminum oxide layer.

The gate electrode 722 is formed on the first insulating layer 730. The gate electrode 722 may be formed in a single layer or multi-layer made of any one of molybdenum (Mo), aluminum (Al), chromium (Cr), gold (Au), titanium (Ti), nickel (Ni), neodymium (Nd), and copper (Cu), or any alloy thereof.

An interlayer insulating layer 740 is formed over the gate electrode 722. The interlayer insulating layer 740 may be formed of an inorganic layer, e.g., a silicon nitride layer, a silicon oxynitride layer, a silicon oxide layer, a titanium oxide layer, or an aluminum oxide layer.

The first electrode 751 and the second electrode 752 are formed on the interlayer insulating layer 740. Each of the first electrode 751 and the second electrode 752 is connected to the active layer 721 through a contact hole penetrating the first insulating layer 730 and the interlayer insulating layer 740. Each of the first electrode 751 and the second electrode 752 may be formed in a single layer or multi-layer made of any one of molybdenum (Mo), aluminum (Al), chromium (Cr), gold (Au), titanium (Ti), nickel (Ni), neodymium (Nd), and copper (Cu), or any alloy thereof. In an embodiment, the first electrode 751 may be a source electrode of the thin film transistor, and the second electrode 752 may be a drain electrode of the thin film transistor.

The first photoelectric device PD1 may be disposed on any one of the first electrode 751 and the second electrode 752. For example, the first photoelectric device PD1 is disposed on the first electrode 751.

The first photoelectric device PD1 may include a plurality of semiconductor layers sequentially stacked in the thickness direction of the base substrate 710. Specifically, the first photoelectric device PD1 may include a P-type semiconductor layer doped with a P-type impurity, an intrinsic semiconductor layer joined with the P-type semiconductor layer, and an N-type semiconductor layer that is joined with the intrinsic semiconductor layer and is doped with an N-type impurity. That is, the first photoelectric device PD1 may be a P-I-N-type photo diode.

A second insulating layer 760 for insulating and protecting the thin film transistor from the first photoelectric device PD1 is formed over the first electrode 751, the second electrode 752, and the first photoelectric device PD1. The second insulating layer 760 may be formed of an inorganic layer, e.g., a silicon nitride layer, a silicon oxynitride layer, a silicon oxide layer, a titanium oxide layer, or an aluminum oxide layer. However, the present invention is not limited thereto. In an example embodiment, the second insulating layer 760 may be formed of an organic layer such as acrylic resin, epoxy resin, phenolic resin, polyamide resin, or polyimide resin.

A third electrode 771 and a fourth electrode 772 are formed on the second insulating layer 760. The third electrode 771 is electrically connected to the first photoelectric device PD1 through a contact hole penetrating the second insulating layer 760. The fourth electrode 772 is electrically connected to the second electrode 752 of the thin film transistor through a contact hole penetrating the second insulating layer 760.

However, the present invention is not limited thereto. When the first photoelectric device PD1 is formed on the second electrode 752 according to a disposition structure, the third electrode 771 may be electrically connected to the first electrode 751, and the fourth electrode 772 may be electrically connected to the first photoelectric device PD1.

Each of the third electrode 771 and the fourth electrode 772 may be formed in a single layer or multi-layer made of any one of molybdenum (Mo), aluminum (Al), chromium (Cr), gold (Au), titanium (Ti), nickel (Ni), neodymium (Nd), and copper (Cu), or any alloy thereof.

The second photo sensor PHS2 may be disposed on any one of the third electrode 771 and the fourth electrode 772. The second photo sensor PHS2 includes a circuit layer CC, a second photoelectric device PD2, and a color filter layer CF.

The circuit layer CC may be a layer on which the four transistors and the signal lines, which are described in FIG. 7, are disposed. The circuit layer CC may be formed in a structure in which a plurality of metal layers and a plurality of insulating layers are stacked.

Like the first photoelectric device PD1, the second photoelectric device PD2 may be a device that generates an electrical signal according to light incident thereonto. The second photoelectric device PD2 may be a P-I-N-type photo diode. Description of the second photoelectric device PD2 is similar to that of the first photoelectric device PD1, and therefore, the detailed description of the second photoelectric device PD2 will be omitted. The second photoelectric device PD2 may be disposed on the circuit layer CC, and be electrically connected to the transistors and the signal lines in the circuit layer CC.

In this embodiment, a case where the second photo sensor PHS2 has a structure in which the second photoelectric device PD2 is disposed on the circuit layer CC is described as an example. However, in another embodiment, the second photo sensor PHS2 may have a structure in which the circuit layer CC is disposed on the second photoelectric device PD2.

The color filter layer CF may be disposed on the second photoelectric device PD2. The color filter CF allows light of a specific color to be transmitted therethrough, and may block the transmission of lights of the other colors by absorbing the lights. Thus, in addition to the brightness of a fingerprint image, the color of the fingerprint image may be recognized through a plurality of color filter layers CF disposed on a plurality of second photo sensors PHS2. The color filter layer CF may be consecutively formed on a plurality of second photo sensors PHS2. For example, the color filter layer CF may be a Bayer filter in an area ratio of a red color filter, a blue color filter, and a green color filter is 1:1:2.

Although not shown in the drawing, a lens layer may be further disposed on the color filter layer CF. The lens layer may concentrate light incident from the outside on the second photoelectric device PD2, and increase the sensing sensitivity of the second photo sensor PHS2 by increasing the light absorptivity of the second photoelectric device PD2.

A protective layer 780 for protecting the sensing panel 700 may be disposed over the third electrode 771, the fourth electrode 772, and the second photo selector PHS2. The protective layer 780 may include an organic material, and be formed of an organic layer such as acrylic resin, epoxy resin, phenolic resin, polyamide resin, or polyimide resin. The protective layer 780 may function to planarize a step difference due to the first photo sensor PHS1 and the second photo sensor PHS2 on the base substrate 710.

As described above, the second photo sensor PHS2 may have a size smaller than that of the first photo sensor PHS1. For example, the width wPHS1 of the first photo sensor PHS1 per unit sensor may be about 30 μm to about 100 μm, and the width wPHS2 of the second photo sensor PHS2 per unit sensor may be about 0.1 μm to about 10 μm.

That is, the second photo sensor PHS2 is formed smaller than the first photo sensor PHS1, and hence the degree of integration of photo sensors may be increased. Thus, a larger number of second photo sensors PHS2 may be disposed in the same area, and high-resolution fingerprint sensing may be performed.

As shown in FIG. 2, the second sensing region SA2 is a region that requires a high resolution in the sensing panel 700, and the second photo sensor PHS2 having a small size may be disposed in the second sensing region SA2. In addition, the first photo sensor PHS1 may be disposed in the first sensing region SA1 that occupies a majority of the sensing panel 700. When a fingerprint of a user is registered using the second photo sensors PHS2 of the second sensing region SA2 that is a high-resolution fingerprint recognition region when the fingerprint of the user is registered for the first time, the accuracy in a subsequent recognition process may be considerably increased. In addition, the second photo sensor PHS2 including the color filter may recognize a color. Thus, the second photo sensor PHS2 may be used as a bio-sensor for sensing human body information such as scalp, hair or skin in addition to the fingerprint of the user.

Figure 9:
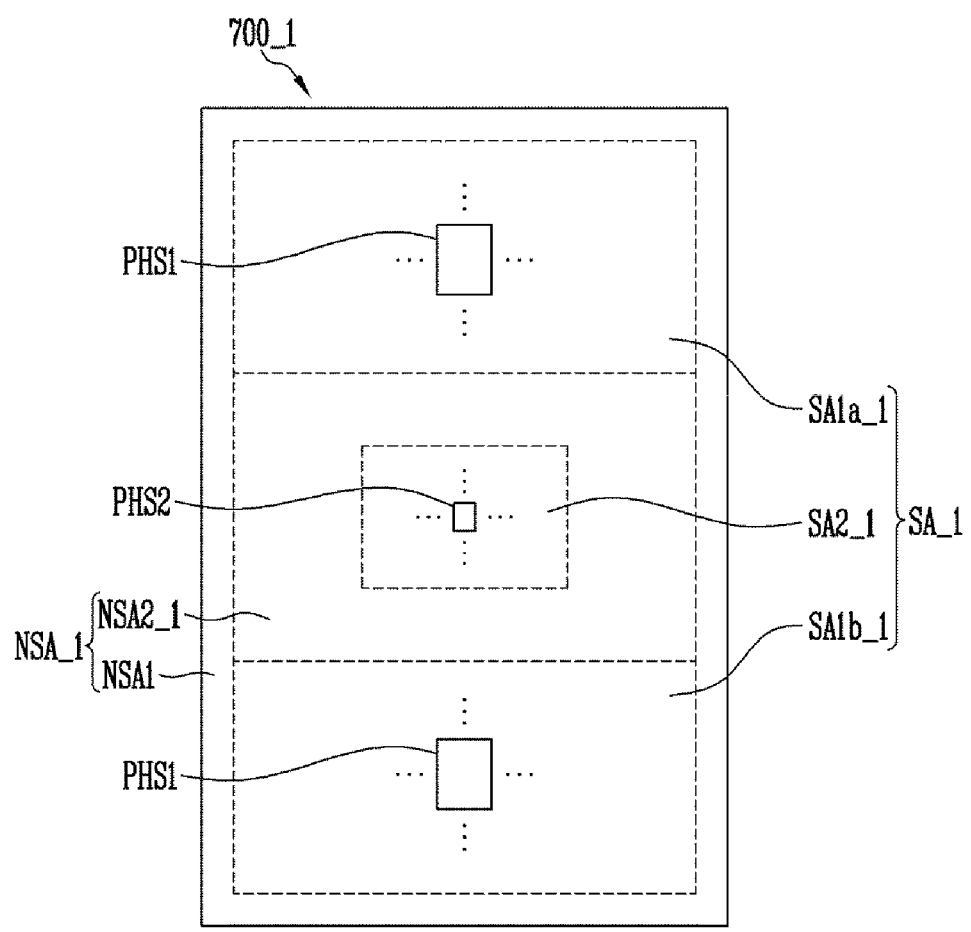
FIG. 9 is a schematic plan view of a sensing panel in accordance with an exemplary embodiment of the present invention.
Figure 10:
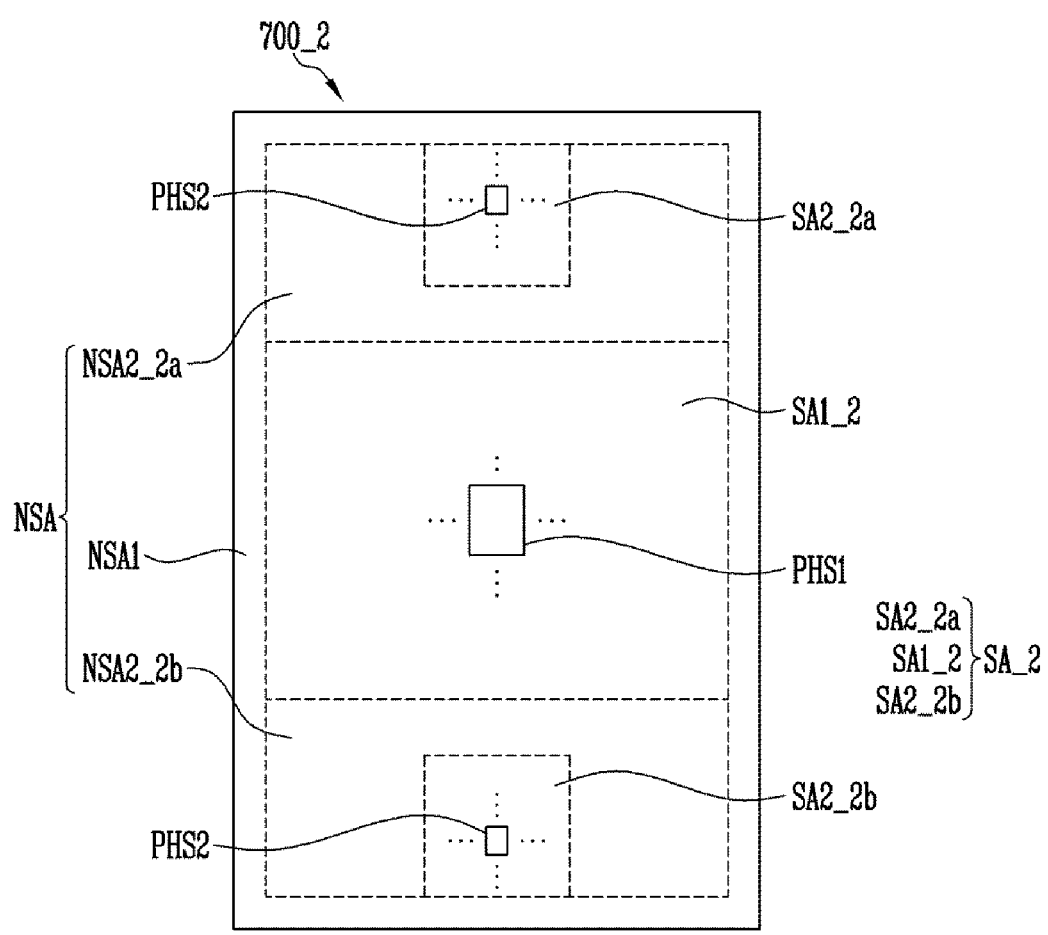
FIG. 10 is a schematic plan view of a sensing panel in accordance with an exemplary embodiment of the present invention.

FIG. 9 is a schematic plan view of a sensing panel in accordance with an exemplary embodiment of the present invention. FIG. 10 is a schematic plan view of a sensing panel in accordance with an exemplary embodiment of the present invention. The embodiments of FIGS. 9 and 10 are different from the above-described embodiment, in that three or more sensing regions SA are formed on the sensing panel 700, and the other configuration is identical or similar to that of the above-described embodiment. Hereinafter, differences will be mainly described.

Referring to FIG. 9, a sensing panel 700_1 includes a sensing region SA_1 and a non-sensing region NSA_1, and the sensing region SA_1 includes a first sensing region SA1a_1, a second sensing region SA2_1, and a third sensing region SA1b_1. The non-sensing region NSA_1 includes a first non-sensing region NSA1 and a second non-sensing region NSA2_1.

The first sensing region SA1a_1 and the third sensing region SA1b_1 may be regions including first photo sensors PHS1. Specifically, the first sensing region SA1a_1 is formed adjacent to one short side of the sensing panel 700_1, and the third sensing region SA1b_1 is formed adjacent to the other short side of the sensing panel 700_1. The first sensing region SA1a_1 and the third sensing region SA1b_1 are spaced apart from each other.

The second sensing region SA2_1 is a region including second photo sensors PHS2. Specifically, the second sensing region SA2_1 is disposed between the first sensing region SA1a_1 and the third sensing region SA1b_1. The second sensing region SA2_1 may be formed adjacent to a central portion of the sensing panel 700_1. The second sensing region SA2_1 may have an area smaller than that of each of the first sensing region SA1a_1 and the third sensing region SA1b_1.

The second non-sensing region NSA2_1 may be a region that does not include the first and second photo sensors PHS1 and PHS2. The second non-sensing region NSA2_1 is formed to surround the second sensing region SA2_1. Also, the second non-sensing region NSA2_1 is formed between the first sensing region SA1a_1 and the second sensing region SA2_1, and is formed between the second sensing region SA2_1 and the third sensing region SA1b_1. The second non-sensing region NSA2_1 may include a signal line connecting the first photo sensor PHS1 in the first sensing region SA1a_1 and the second photo sensor PHS2 in the second sensing region SA2_1, and include a signal line connecting the first photo sensor PHS1 in the third sensing region SA1b_1 and the second photo sensor PHS2 in the second sensing region SA2_1.

Referring to FIG. 10, a sensing panel 700_2 includes a sensing region SA_2 and a non-sensing region NSA_2, and the sensing region SA_2 includes a first sensing region SA1_2, a second sensing region SA2_2a, and a third sensing region SA2_2b. The non-sensing region NSA_2 includes a first non-sensing region NSA1, a second non-sensing region NSA2_2a, and a third non-sensing region NSA2_2b.

The first sensing region SA1_2 may be a region including first photo sensors PHS1. The first sensing region SA1_2 is formed at a central portion of the sensing panel 700_2, and has the widest area among the sensing regions SA1_2, SA2_2a, and SA2_2b formed in the sensing panel 700_2. The first sensing region SA1_2 is formed between the second sensing region SA2_2a and the third sensing region SA2_2b.

The second sensing region SA2_2a and the third sensing region SA2_2b may be regions including second photo sensors PHS2. Specifically, the second sensing region SA2_2a is formed adjacent to one short side of the sensing panel 700_2. The third sensing region SA2_2b is formed adjacent to the other short side of the sensing panel 700_2. Each of the second sensing region SA2_2a and the third sensing region SA2_2b has an area smaller than that of the first sensing region SA1_2. In addition, the sum of the area of the second sensing region SA2_2a and the area of the third sensing region SA2_2b may be smaller than the area of the first sensing region SA1_2.

The second non-sensing region NSA2_2a and the third non-sensing region NSA2_2b may be regions that do not include the first and second photo sensors PHS1 and PHS2. The second non-sensing region NSA2_2a is formed to surround the second sensing region SA2_2a. In addition, the third non-sensing region NSA2_2b is formed to surround the third sensing region SA2_2b.

The second non-sensing region NSA2_2a is formed between the first sensing region SA1_2 and the second sensing region SA2_2a. The second non-sensing region NSA2_2a may include signal lines connecting the first photo sensors PHS1 in the first sensing region SA1_2 and the second photo sensor PHS2 in the second sensing region SA2_2a. In addition, the third non-sensing region NSA2_2b may be formed between the first sensing region SA1_2 and the third sensing region SA2_2b. The third non-sensing region NSA2_2b may include signal lines connecting the first photo sensors PHS1 in the first sensing region SA1_2 and the second photo sensor PHS2 in the third sensing region SA2_2b.

Figure 11A:
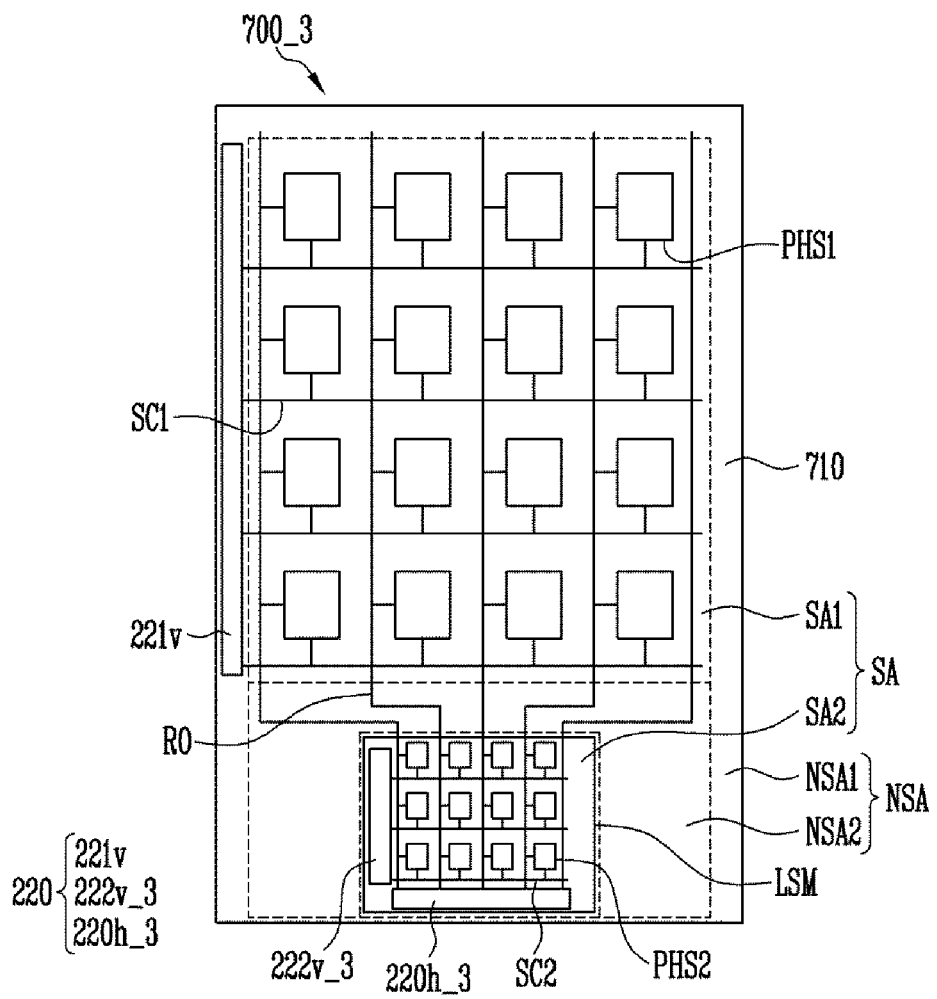
FIG. 11A is a schematic plan view of a sensing panel in accordance with an exemplary embodiment of the present invention.
Figure 11B:
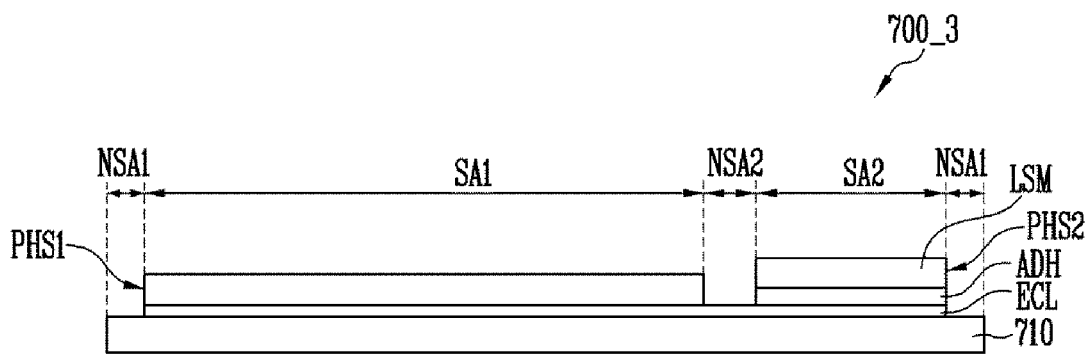
FIG. 11B is a side view of the sensing panel shown in FIG. 11A in accordance with an exemplary embodiment of the present invention.

FIG. 11A is a schematic plan view of a sensing panel in accordance with an exemplary embodiment of the present invention. FIG. 11B is a side view of the sensing panel shown in FIG. 11A. The embodiment shown in FIGS. 11A and 11B is different from the embodiment shown in FIG. 5, in that a second photo sensor is integrated with a fingerprint detector to constitute a photo sensor module and is attached onto a base substrate, and the other configuration is identical or similar to that of the embodiment shown in FIG. 5. Therefore, differences will be mainly described.

Referring to FIGS. 11A and 11B, the sensing panel 700_3 includes a base substrate 710, first and second photo sensors PHS1 and PHS2 arranged on the base substrate 710, a fingerprint detector 220, and various signal lines SC1, SC2, and RO. The fingerprint detector 220 includes a first vertical fingerprint detector 221v, a second vertical fingerprint detector 222v_3, and a horizontal fingerprint detector 220h_3.

The first photo sensors PHS1 are disposed in a first sensing region SA1, and are electrically connected to the first vertical fingerprint detector 221v disposed in a first non-sensing region NSA1 through first driving signal lines SC1. The position of the first vertical fingerprint detector 221v is not limited to the first non-sensing region NSA1. In some embodiments, the first vertical fingerprint detector 221v may be disposed in the first sensing region SA1.

The second photo sensors PHS2 are disposed in a second sensing region SA2. The first photo sensors PHS1 disposed in the first sensing region SA1 and the second photo sensors PHS2 disposed in the second sensing region SA2 may be electrically connected through a signal line layer ECL disposed on the base substrate 710. For example, the signal line layer ECL may be a circuit layer including at least one of the first driving signal lines SC1, second driving signal lines SC2, and detection signal lines RO.

The second photo sensors PHS2 along with the second vertical fingerprint detector 222v_3 and the horizontal fingerprint detector 220h_3, which are disposed in the second sensing region SA2, may constitute a photo sensor module LSM. In an embodiment, the second photo sensors PHS2, the second vertical fingerprint detector 222v_3, and the horizontal fingerprint detector 220h_3 may be integrated as one Integrated Circuit (IC) to constitute the photo sensor module LSM.

The photo sensor module LSM including the second photo sensor PHS2 may be disposed on the base substrate 710, and be attached onto the base substrate 710 through an adhesive member ADH. The adhesive member ADH may include, for example, an Anisotropic Conductive Film (ACF). Also, the photo sensor module LSM may be attached onto the signal line layer ECL to be electrically connected to the first photo sensor PHS1.

As described above, the horizontal fingerprint detector 220h_3 of the photo sensor module LSM may be connected both the first photo sensors PHS1 and the second photo sensors PHS2, but the present invention is not limited thereto. In some embodiments, the horizontal fingerprint detector 220h_3 of the photo sensor module LSM may be connected to the second photo sensors PHS2, and may not be electrically connected to the first photo sensors PHS1. The first photo sensor PHS1 may receive a detection signal applied by a separate horizontal fingerprint detector.

In the fingerprint sensor and the display device including the same in accordance with the present invention, a low-resolution fingerprint sensor may be entirely disposed on the display panel, and a high-resolution fingerprint sensor may be disposed in a region that requires high resolution, so that manufacturing cost of the display device may be reduced.

Further, in the fingerprint sensor and the display device including the same in accordance with the present invention, a fingerprint may be sensed with a high resolution through a high-resolution fingerprint sensor, and the fingerprint sensor may be used as a bio-sensor for sensing human body information such as pore and scalp.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A fingerprint sensor comprising:
a base substrate including a first sensing region and a second sensing region;
a plurality of first photo sensors disposed on the first sensing region;
a plurality of second photo sensors disposed on the second sensing region,
wherein the first sensing region has an area larger than that of the second sensing region,
wherein the plurality of second photo sensors have an arrangement density higher than that of the plurality of first photo sensors,
wherein each of the plurality of first photo sensors has a first size, and each of the plurality of second photo sensors has a second size smaller than the first size,
wherein the second photo sensors are used for registering a user's fingerprint, and
wherein the first photo sensors and the second photo sensors are configured to detect the user's fingerprint using light reflected from the user's finger; and a horizontal fingerprint detector disposed in the second sensing region adjacent to a short side of the base substrate, wherein the first sensing region has a first height measured along a long side of the base substrate and a first width measured along a short side of the base substrate, and wherein the second sensing region has a second height measured along the long side of the base substrate and a second width measured along the short side of the base substrate, the second width smaller than the first width.

2. The fingerprint sensor of claim 1, wherein each of the plurality of first photo sensors includes a switching transistor and a first photoelectric device connected to one electrode of the switching transistor.

3. The fingerprint sensor of claim 1, wherein the base substrate further includes a first region surrounding the first sensing region and the second sensing region, and wherein no photo sensor is provided in the first region.

4. The fingerprint sensor of claim 3, wherein the first sensing region and the second sensing region are spaced apart from each other, and the base substrate further includes a second region between the first sensing region and the second sensing region, and wherein no photo sensor is provided in the second region.

5. The fingerprint sensor of claim 1, further comprising:

a plurality of detection signal lines on the base substrate, wherein the plurality of first photo sensors are arranged along a first column extending along the long side of the base substrate, wherein the plurality of second photo sensors are arranged along a second column extending along the long side of the base substrate, and wherein the plurality of detection signal lines includes a first detection signal line that are electrically connected to the plurality of first photo sensors, the plurality of second photo sensors, and the horizontal fingerprint detector.

6. The fingerprint sensor of claim 5, wherein the first column and the second column are spaced apart from each other in a direction along the short side of the base substrate.

7. The fingerprint sensor of claim 1, wherein only the second photo sensors are used for registering a user's fingerprint among the first photo sensors and the second photo sensors.

\* \* \* \* \*